United States Patent [19]
Dobert

[11] Patent Number: 5,797,672
[45] Date of Patent: Aug. 25, 1998

[54] SAFETY LIGHT

[76] Inventor: Frank C. Dobert, Earlton Gayhead Rd., Box 204, Earlton, N.Y. 12058

[21] Appl. No.: 766,357

[22] Filed: Dec. 13, 1996

Related U.S. Application Data

[63] Continuation of Ser. No. 401,634, Mar. 9, 1995, abandoned.
[51] Int. Cl.$^6$ .................................................. B62J 6/00
[52] U.S. Cl. .................. 362/190; 362/72; 362/191; 362/226; 362/800
[58] Field of Search .................. 362/226, 800, 362/398, 427, 83.3, 190, 191, 184, 194, 157, 72, 80; 340/432

[56] References Cited

U.S. PATENT DOCUMENTS

| | | | |
|---|---|---|---|
| 3,252,235 | 5/1966 | Goessling et al. | 362/191 |
| 4,575,784 | 3/1986 | Diau | 362/191 |
| 4,859,982 | 8/1989 | Seaburg | 362/61 |
| 5,109,322 | 4/1992 | Loughlin | 362/398 |
| 5,119,280 | 6/1992 | Yang | 362/191 |
| 5,150,284 | 9/1992 | Dobert | 362/83.1 |
| 5,384,693 | 1/1995 | Schwaller et al. | 362/800 |
| 5,438,490 | 8/1995 | Woodbury | 362/61 |
| 5,446,441 | 8/1995 | Su | 362/72 |

*Primary Examiner*—Thomas M. Sember
*Attorney, Agent, or Firm*—Schmeiser, Olsen & Watts

[57] ABSTRACT

The invention is a battery-powered light unit designed to be used as an emergency light or as a temporary replacement for one of a vehicle's tail or marker lights. The unit includes an array of light emitting diodes connected together on a circuit board. The board is attached to the unit using a quick-release connection. The rear surface of the unit includes two outwardly-extending magnets. The magnets are spaced apart by a predetermined distance so that the light unit can be placed on top of an existing light of a vehicle with the magnets contacting the metal body of the vehicle on either side of the light. This allows an operator of the vehicle to place the light unit over a non-functioning tail light or marker light without altering the appearance of the vehicle.

1 Claim, 9 Drawing Sheets

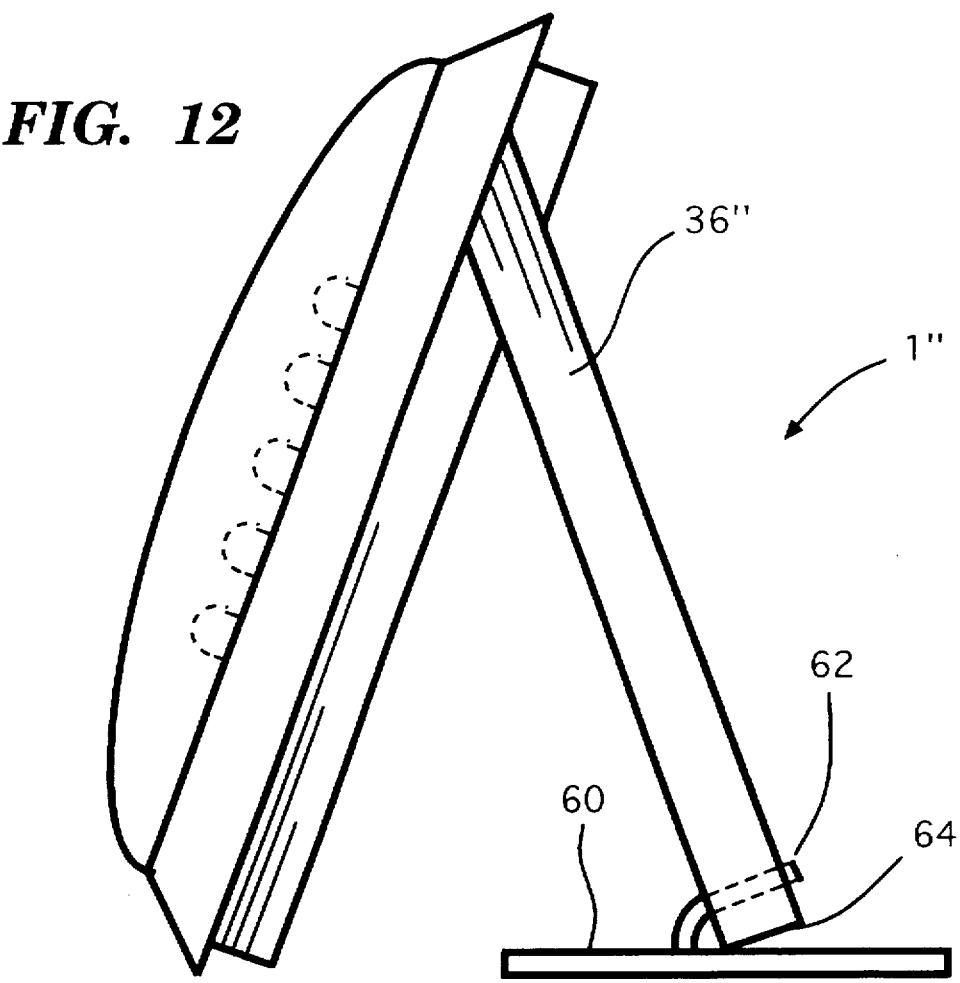
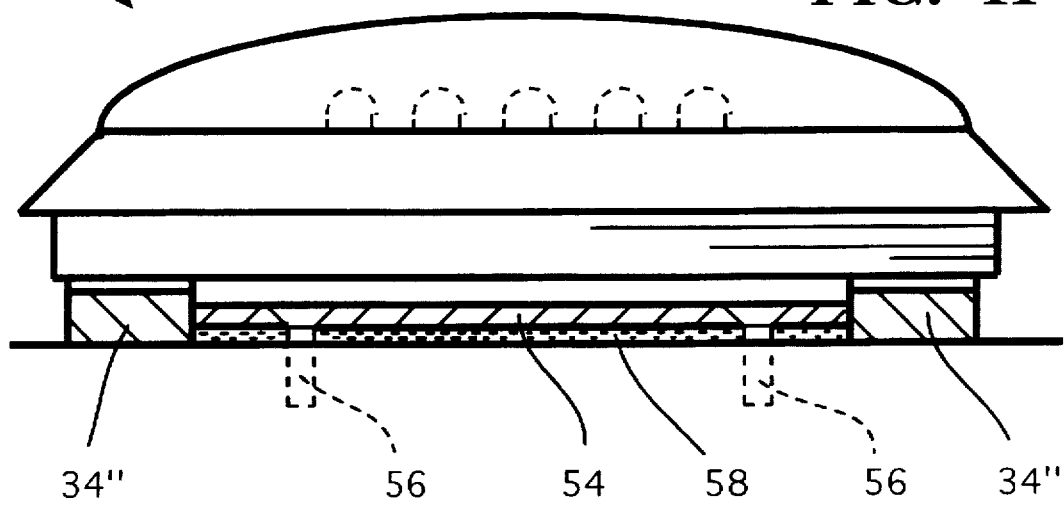

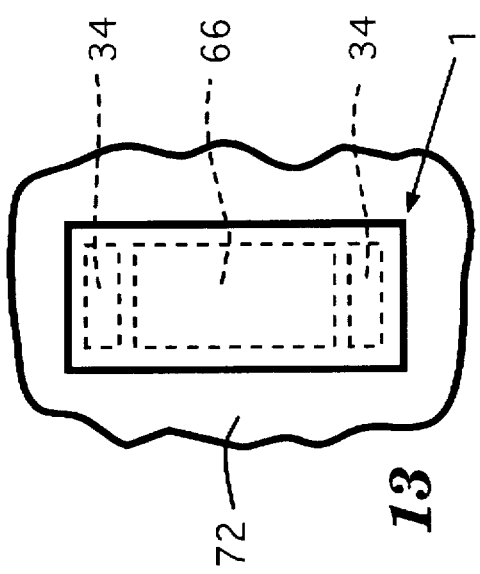
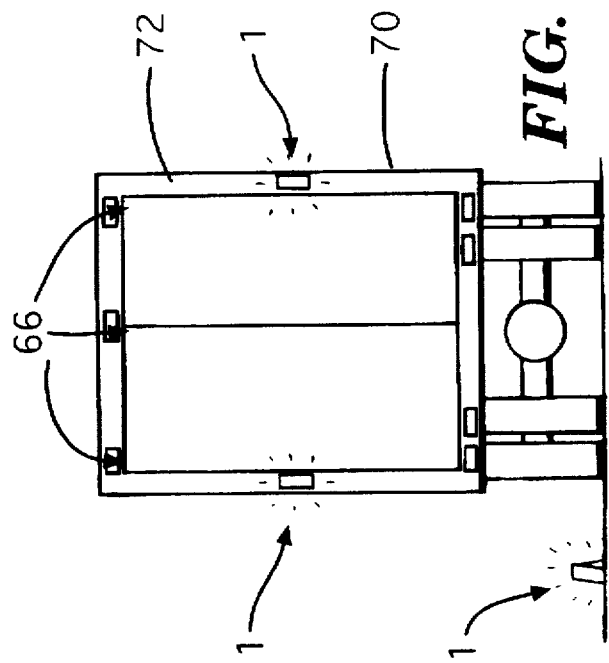
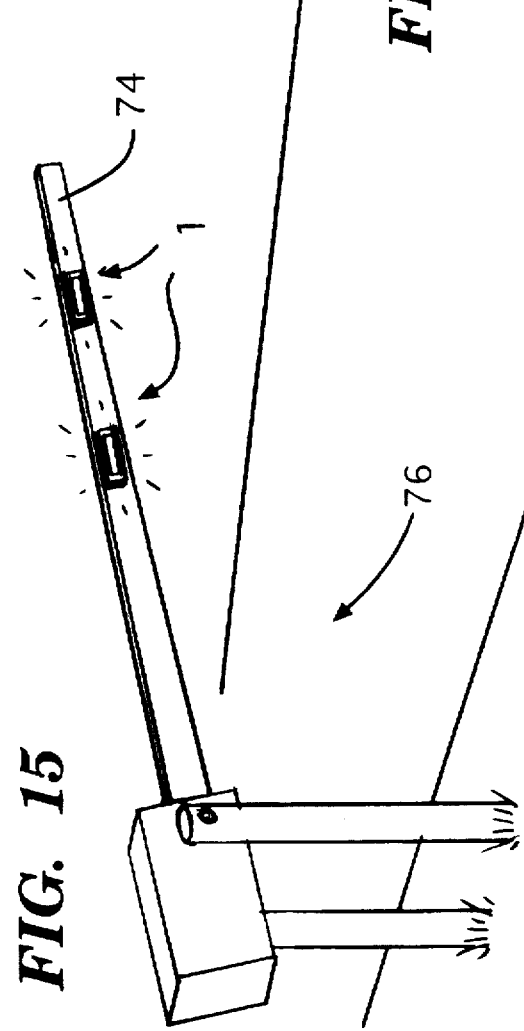
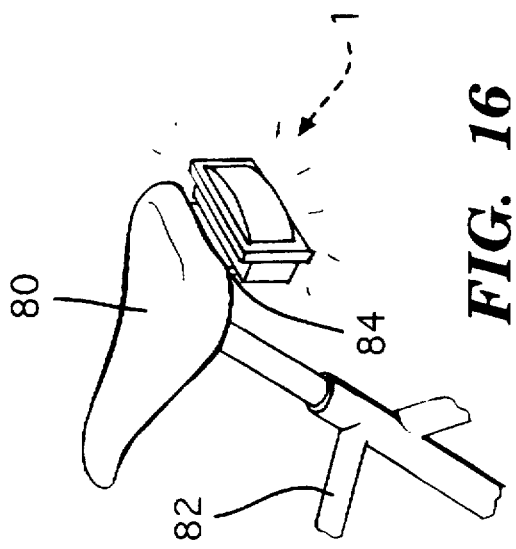

SAFETY LIGHT

This application is a continuation of application Ser. No. 08/401,634, filed Mar. 9, 1995, now abandoned.

FIELD OF THE INVENTION

The invention is in the field of lighting products. More particularly, the invention is a battery-powered portable light unit. The unit includes a replaceable bulb array designed for low power consumption. The shape and dimensions of the unit allow it to be placed over a panel or reflection. Rear-located magnets are employed to secure the unit to a compatible metal surface such as the steel body of a vehicle. The unit also features a deployable stand that enables the unit to be free-standing and useable as an emergency marker light.

BACKGROUND OF THE INVENTION

There are available a number of different types of battery-powered lighting devices. These devices typically include a battery, a manually or automatically-operated control switch and wiring that connects these components to a removable light bulb.

Portable units used for temporary lighting make use of either an incandescent or florescent bulb as a light source. These units are typically designed to remain functional for only a limited amount of time (such as two or three hours) before their battery power source becomes exhausted.

As described in my previous patent (U.S. Pat. No. 5,150,284), one particular use for a portable light unit is as a temporary replacement for a vehicle's tail light or marker light. This use requires a secure mounting of the light unit coupled with the unit's ability to remain functional for an extended period of time. In my prior patent, I taught such a unit with a mounting fixture that allowed the unit to be located adjacent to any one of a vehicle's existing tail or marker lights.

A problem with prior art battery-powered light units is that the unit must be dimensionally quite large to allow it to contain a battery power source sized to enable extended operation of the unit. This makes the unit heavy and exacerbates mounting problems associated with light units designed for temporary installation on a structure or vehicle. Ideally, a vehicle-carried portable light unit should also be adaptable for use as an emergency warning light.

SUMMARY OF THE INVENTION

The invention is a battery-powered light unit that is capable of a number of different uses. The primary use of the light unit is to replace a non-functioning one of a vehicle's tail or marker lights. A secondary use of the light unit is as a warning or emergency light for stationary applications.

The light unit includes an array of ultra-bright light emitting diodes (LED's) that are secured to a semi-flexible circuit board that has an acrylic covering. The board is removable from the unit and a threaded or other type of quick-release socket assembly is employed to electrically-connect the board to wiring located within the unit. The wiring is connected to a removable battery located within an interior battery compartment of the unit. A recessed or otherwise concealed manually-actuated control switch assembly is also connected to the wiring to provide user control of the unit's functional aspects.

The LED array is located at the front of the unit and is surrounded by a reflective surface. A removable glass or plastic lens covers the array. Two end-located magnets extend outwardly from the rear of the unit and are spaced apart. This allows the light unit to be temporarily mounted directly atop an existing light or panel with the magnets contacting the vehicle's steel body.

The light unit also includes a deployable 'U'-shaped stand structure that enables a person to place the light unit on the ground as a warning or emergency marker. The stand structure and/or magnets also allow the unit to be secured to other metal surfaces or to other types of vehicles or structures.

BRIEF DESCRIPTION OF THE DRAWINGS

FIG. 11 provides a top view of a third embodiment of the invention. In this embodiment, the rear of the invention includes a mounting plate which is secured to a surface.

FIG. 12 shows a second embodiment of the deployable stand used in conjunction with any of the other embodiments of the invention.

FIG. 13 is a front view of a light unit in accordance with either of FIGS. 1, 6 and 11 shown in position atop a taillight of a vehicle.

FIG. 14 is a rear view of a vehicle employing light units in accordance with the invention. Also shown in this view is the use of a light unit in accordance with the invention as a stand alone unit.

FIG. 15 is a generalized view of the use of light units in accordance with the invention secured to the movable arm of a railroad crossing sign.

FIG. 16 is a generalized view of a light unit in accordance with the invention attached to a bicycle's seat.

DETAILED DESCRIPTION OF THE DRAWINGS

Figure 2:
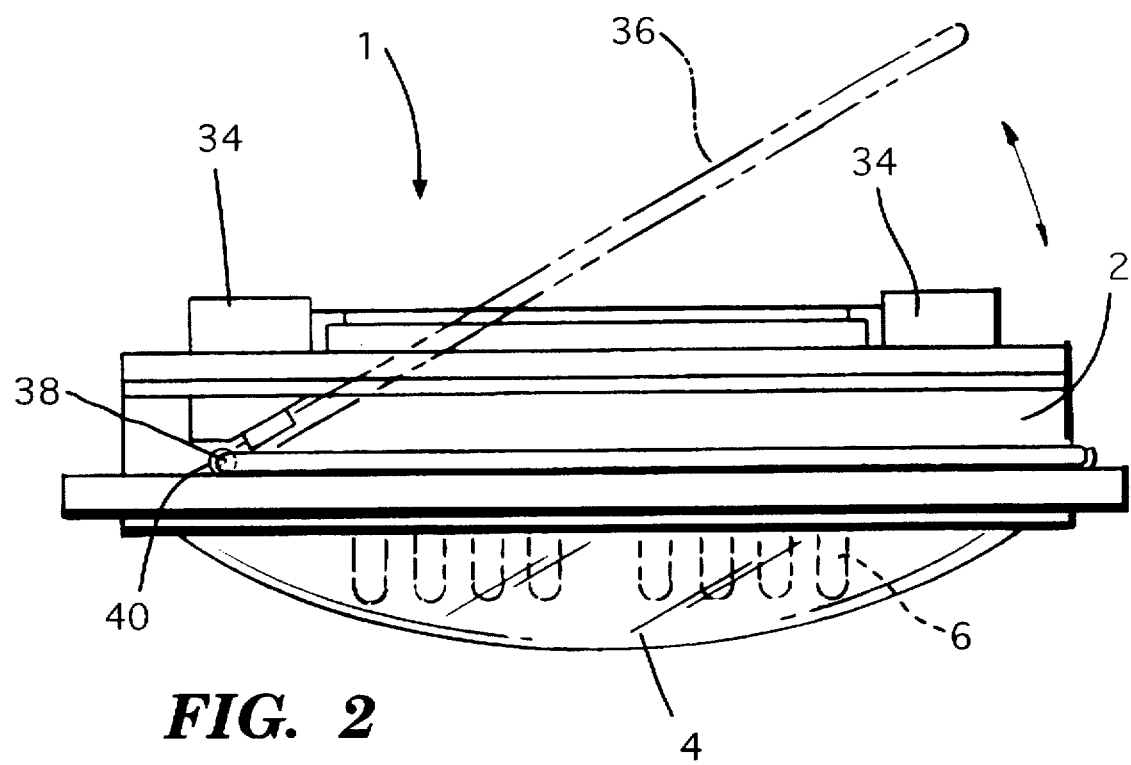
FIG. 2 is a top view of the light unit shown in FIG. 1.
Figure 1:
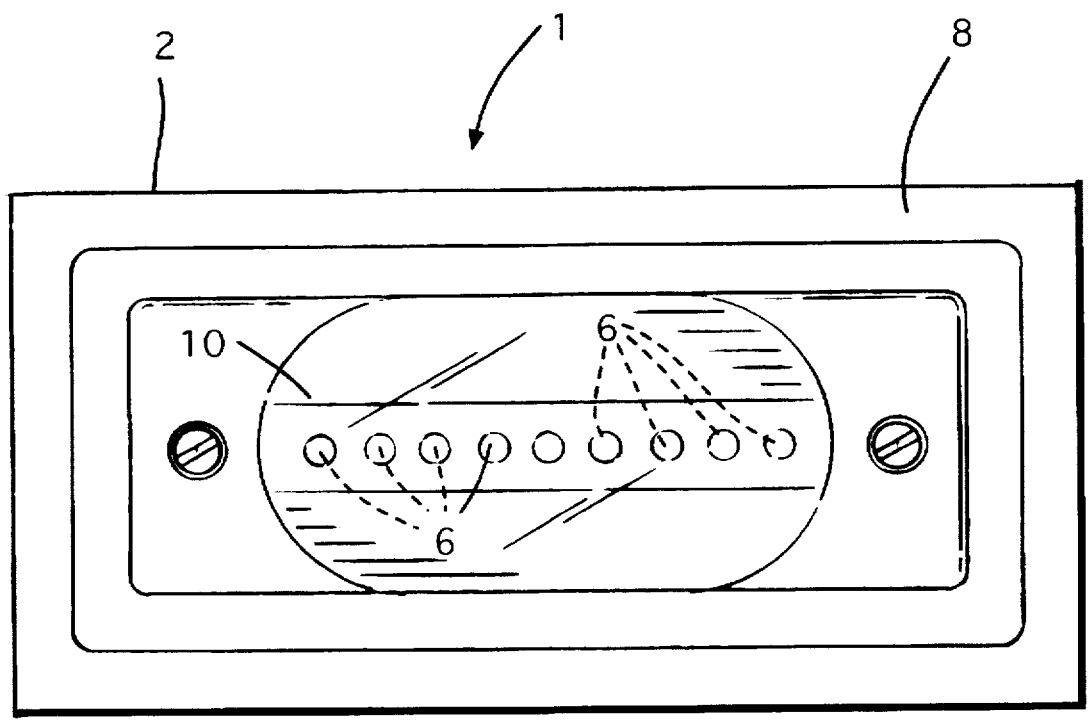
FIG. 1 is a front view of a light unit in accordance with the invention.

Referring now to the drawings in greater detail, wherein like reference characters refer to like parts throughout the several figures, there is shown by the numeral 1 a battery-powered light unit in accordance with the invention.

FIGS. 1-5 provide detailed views of a first basic embodiment of the light unit. Light unit 1 is basically rectangular in shape and includes a housing 2. A removable lens 4 is secured to the front of the housing. Behind the lens is an array of ultra-bright LED's 6. Surrounding the lens is a band 8 of fluorescent paint.

The LED's 6 are mounted on a common circuit board 10 that is preferably made from a slightly flexible material.

Preferably covering the board is an acrylic plastic layer that provides a waterproofing of the board's circuitry.

It should be noted that the use of an array of LED's in lieu of a standard light bulb allows the light unit 1 to achieve a much lower rate of power consumption than other prior art lighting devices while providing sufficient illumination for the desired uses. In this manner, the light unit can be used for an extended period of time without requiring any replacement or recharging of its batteries.

The rear of board 10 includes a projection 12 that fits within a socket 14 in the housing in a quick-release type of locking engagement. The connection assembly is shown in detail in FIG. 5. The connection is basically identical to the type of connection commonly used for removably securing a vehicle's tail light bulb within its socket. The board-attached male portion 12 includes projections 16 that are received within grooves 18 in the socket. To complete the connection, the board is rotated slightly so that the projections become secured within groove 20 located at the bottom of the socket. The projections and socket include electrical leads (not shown) that connect the wiring (not shown) of the board to the wiring (not shown) located within the housing.

It should be noted that other types of quick-release type connections normally employed for removable light bulbs (such as a threaded socket) may be alternatively employed. It should also be noted that a quick-release type connection is hereby defined as one that does not employ solder to make the direct connection to the light bulb.

Figure 4:
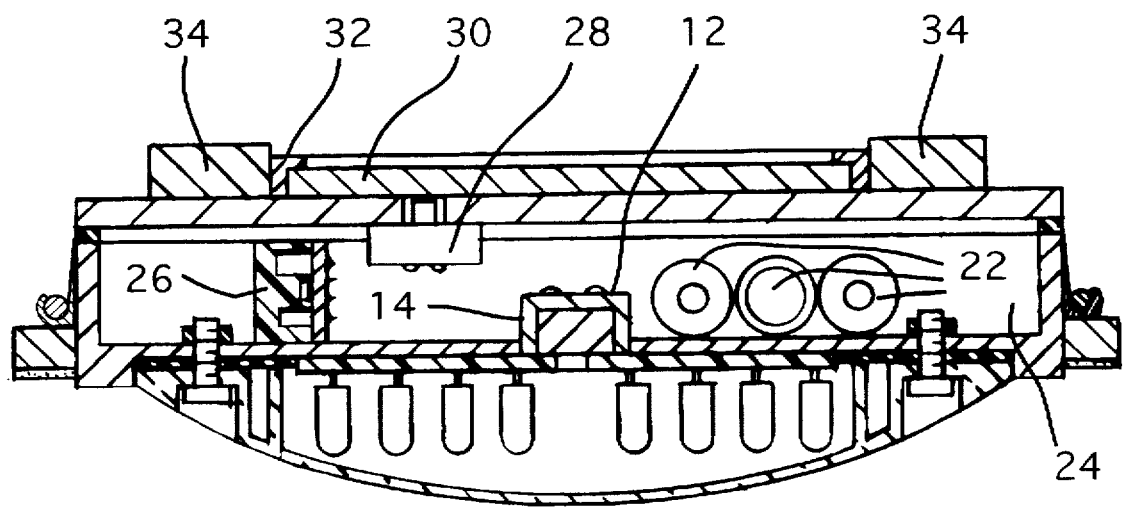
FIG. 4 is a cross-sectional view of the light unit shown in FIG. 1.
Figure 5:
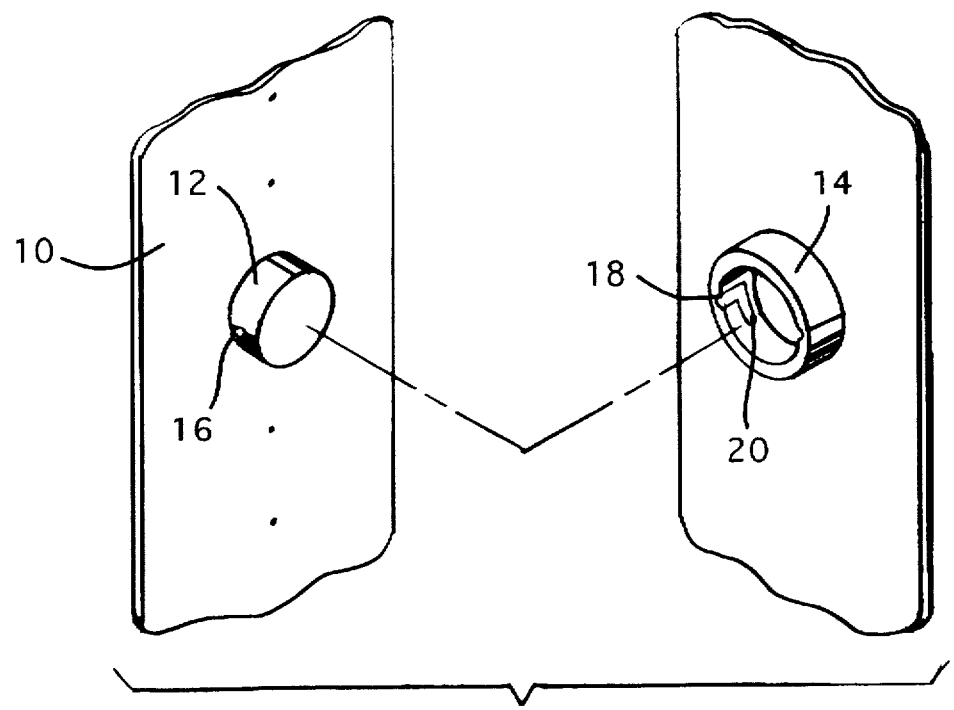
FIG. 5 is a detailed view of the socket assembly that connects the LED panel to the housing.
Figure 17:
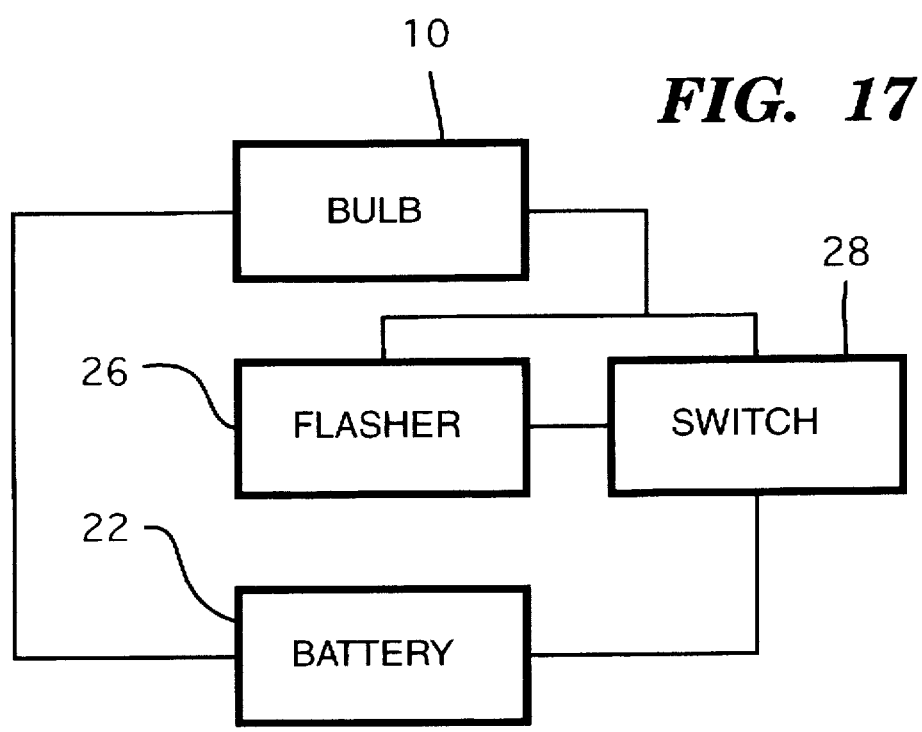
FIG. 17 is a generalized wiring diagram for a light unit in accordance with the invention.
Figure 7:
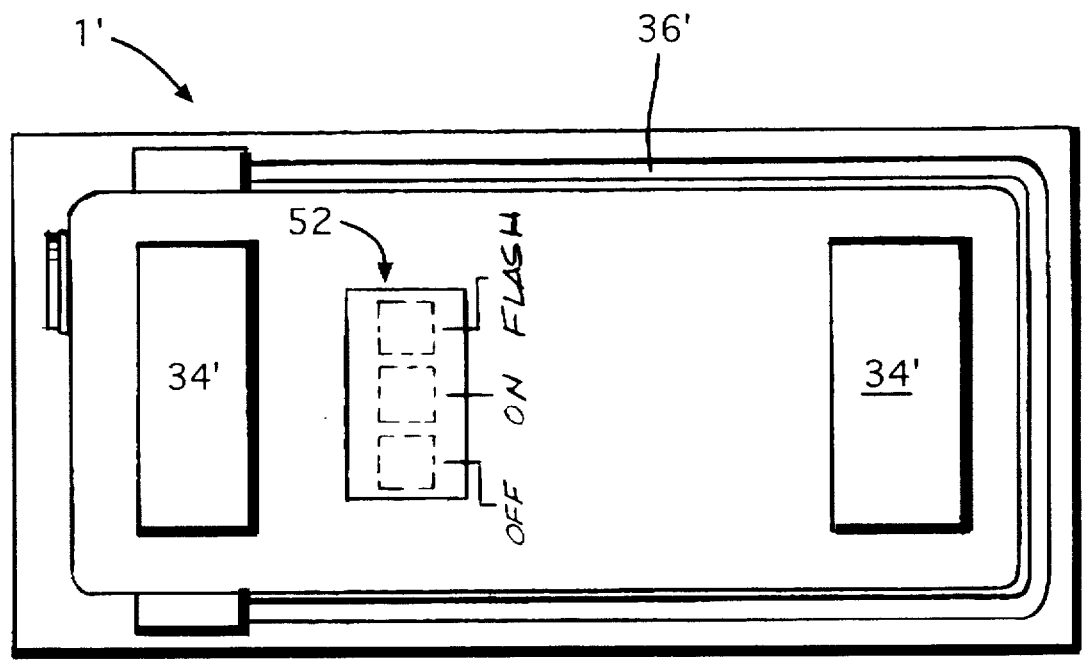
FIG. 7 is a rear view of the light unit shown in FIG. 6.
Figure 6:
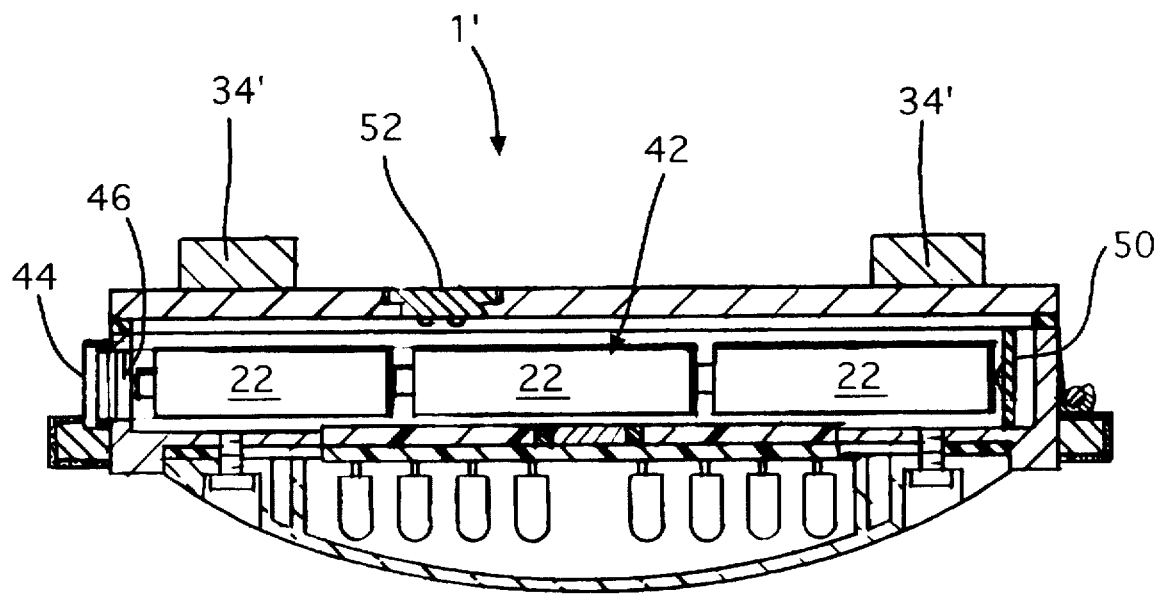
FIG. 6 is a cross-sectional view of a second embodiment of the invention.
Figure 8:
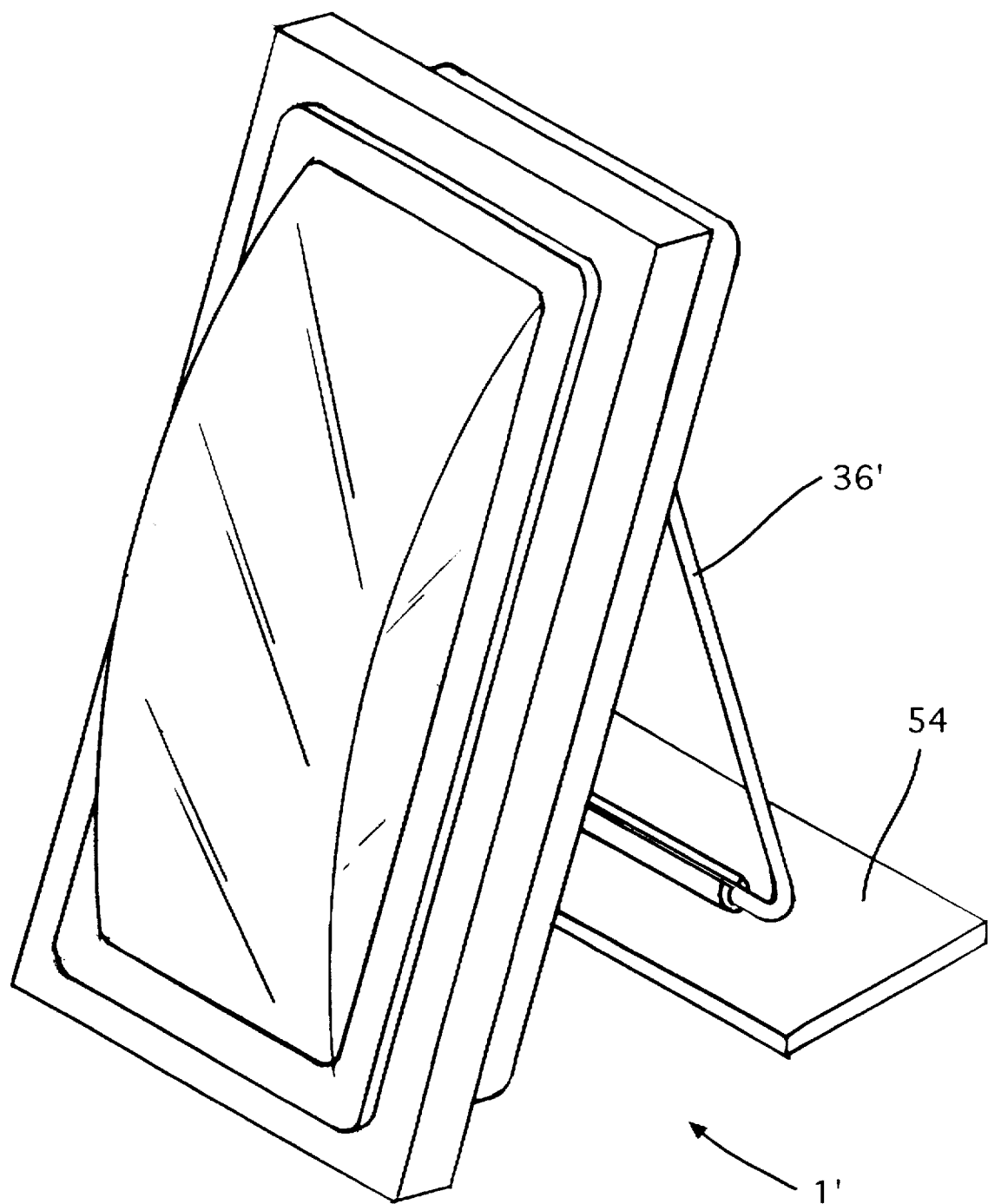
FIG. 8 is a perspective front view of the light unit shown in FIG. 6. The unit's stand is shown in a deployed condition.
Figure 9:
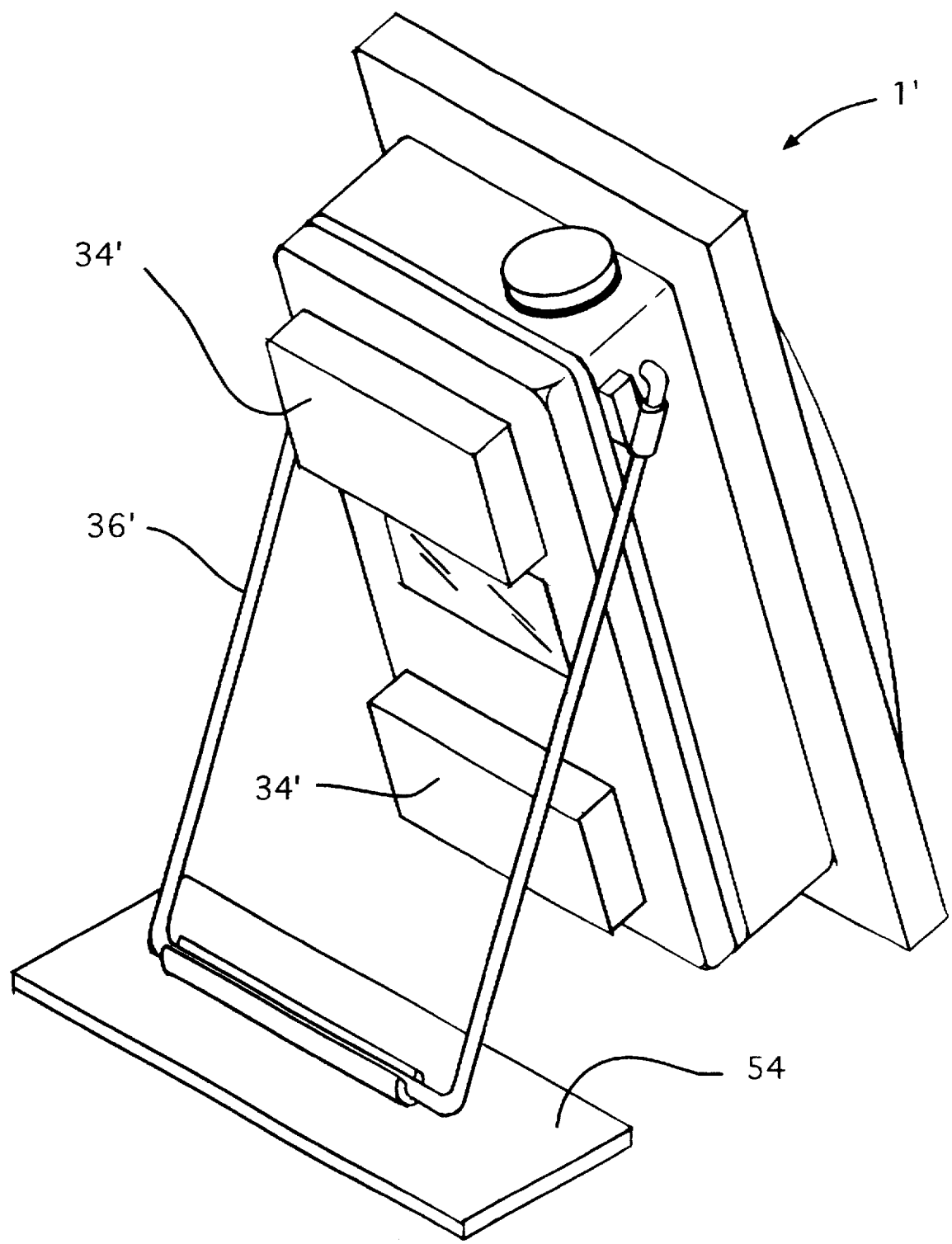
FIG. 9 is a perspective rear view of the light unit shown in FIG. 8.

FIG. 4 provides a cross-sectional view of the light unit 1. In this view, it can be seen that the unit houses three batteries 22 in an interior battery compartment 24. The batteries are connected to the socket 14 by wiring (not shown). A flasher assembly 26 and a manual control switch 28 are also connected to the housing's wiring (connection not shown). The flasher assembly is designed to intermittently actuate the LED array. The control switch 28 provides manual control of the power flow within the unit. It should be noted that while a conventional mechanical switch is shown, an electronic touchpad may be alternatively employed. It should also be noted that a generalized wiring diagram of the invention is provided in FIG. 17.

As also shown in FIG. 4, the control switch is located behind a panel 30 such as a reflector. The panel is removable from the unit and slides within a 'U'-shaped flange structure 32.

The rear face of the light unit includes two outwardly-extending magnets 34. The magnets are spaced apart by a distance of approximately three to four inches. Each magnet is approximately one inch wide by two inches long and preferably protrudes outwardly from the rear surface of the housing by a distance of one-quarter inch to one inch. The magnets have a combined strength that enables them to securely affix the light unit to a vertically-oriented surface.

The light unit further includes a deployable stand in the form of a 'U'-shaped frame 36. The frame is made from either a rigid plastic or metal material. End portions 38 of the frame are pivotally secured within complementary receiving sockets 40 located in opposite side edges of the rear portion of the housing. The frame may be pivoted from a stored position in which it lies against the housing to a deployed position where it is angled away from the rear of the housing (note FIG. 2).

FIGS. 6–10 provide views of a second embodiment 1' of a light unit in accordance with the invention. This embodiment is very similar to the first embodiment in its general structure.

Figure 10:
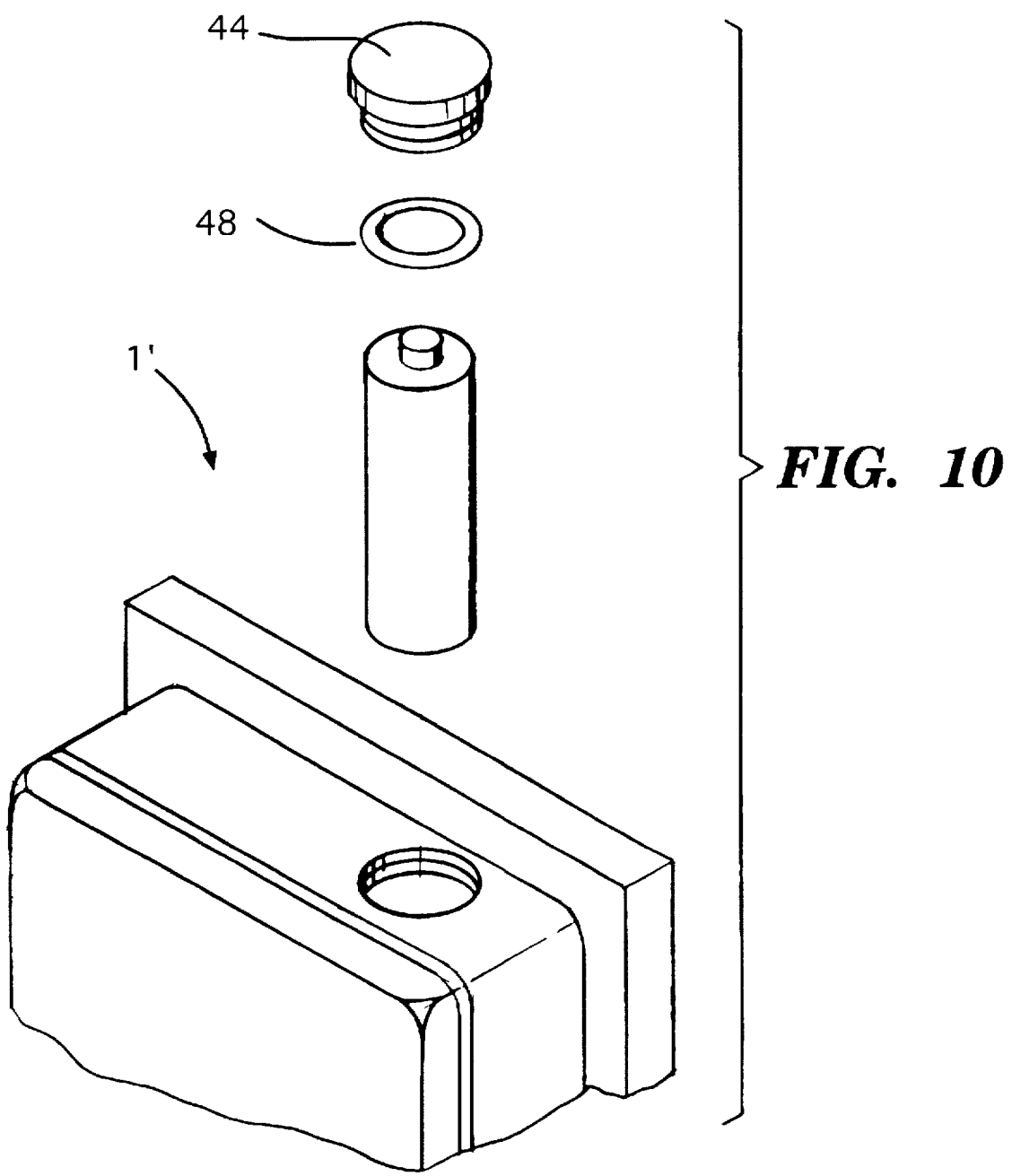
FIG. 10 is a an exploded view of a portion of the light unit shown in FIG. 6.

A first difference between the embodiments resides in the orientation of the batteries 22 and the shape and structure of the battery compartment 42. The batteries 22 are oriented horizontally and extend across the housing from one side to the other. The batteries are entered into the battery compartment by removing a round plug 44 (note FIG. 10) that includes a metallic bottom surface 46. As can be seen in FIG. 10, a gasket 48 is located on the plug and threads are used to releasably secure the plug to the housing. Once the batteries are within the compartment and the plug is re-installed, surface 46 makes contact with the housing's internal wiring (not shown) and connects the batteries to said wiring. The battery compartment includes a second plate 50 that is also connected to the housing's internal wiring.

A second difference between this embodiment and the previous embodiment is that the switch 52 that turns the light unit "on" or "off" is in the form of an electronic touchpad.

Another difference between the second and first embodiments of the invention is in the design of the stand structure. In the second embodiment, the stand includes a foot member 54 that is removably secured to the frame 36'. The foot member enhances the stability of the unit when it is deployed on a horizontal surface.

It should be noted that the second embodiment includes a pair of magnets 34' that function in the same way as the magnets of the first embodiment. The magnets are spaced apart from each other by a distance of approximately three and one-half-inches to four inches.

Figure 3:
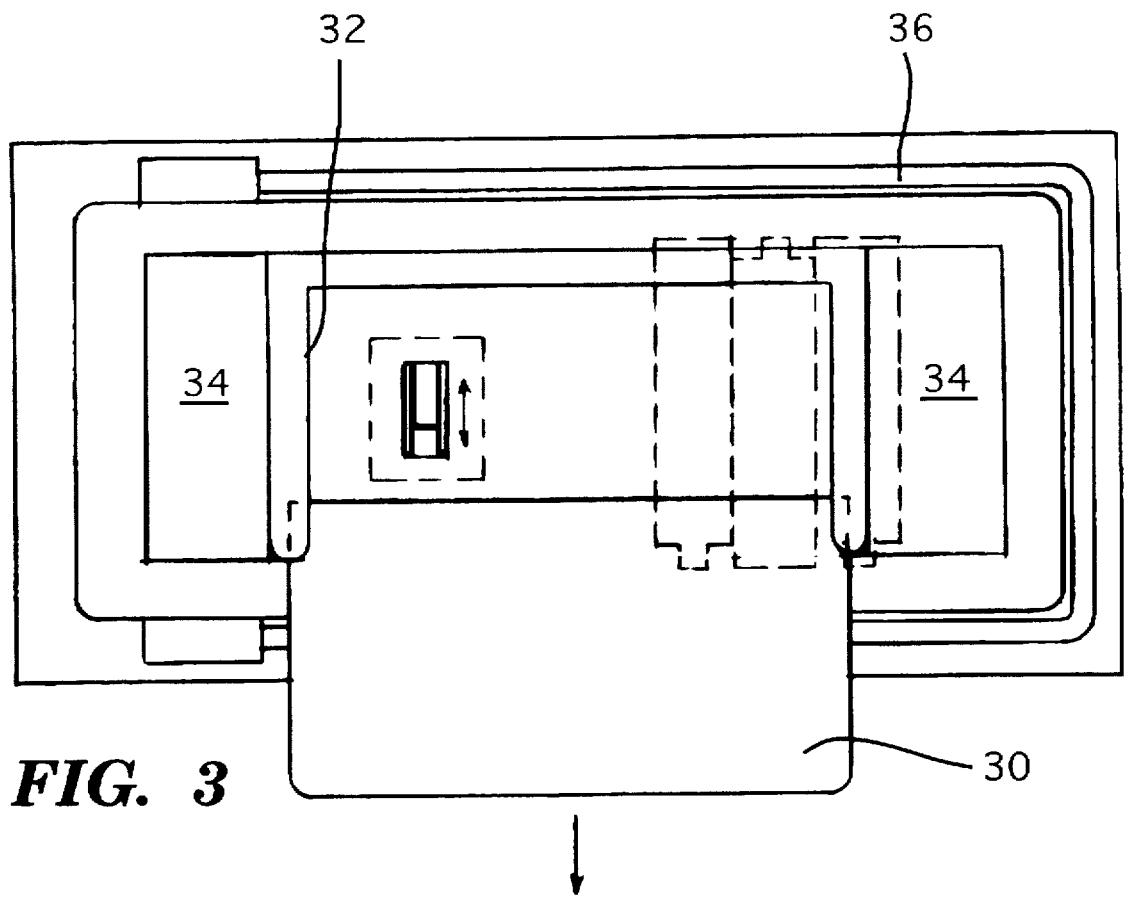
FIG. 3 is a rear view of the light unit shown in FIG. 1.

FIGS. 11 and 12 provide views of a third embodiment 1" of the invention. In this embodiment, the light unit is basically unchanged but its mounting apparatus and stand are slightly altered. To mount the light unit, its magnets may be employed in the same manner as taught in the previous embodiments. However, in this embodiment, the light unit 1" includes a plate 55 that may be secured to a vehicle's surface using either a pair of screws 56 or a layer of adhesive 58. Once the plate 55 has been secured to the surface, the light unit can be placed over the plate with the magnets 34" contacting the plate's periphery. The magnets will then secure the unit to the plate. It should be noted that while a plate that fits between the magnets is shown, it may be replaced by a larger metal plate (not shown) that would underlie the magnets. As another alternative, plate 55 may be releasably received within a 'U'-shaped flanged structure located on the rear of the housing as shown in FIG. 3. In this manner, it would take the place of panel 30 (described in the first embodiment of the invention) and be received within structure 32.

In FIG. 12, the light unit is shown with its stand deployed. In this embodiment, the stand includes a removable foot 60 that includes a shaped pin 62 designed to fit over the bottom edge 64 of the frame 36". As another alternate, the frame can include a receiving structure (not shown) that includes an aperture designed to receive the pin.

FIGS. 13–16 detail possible uses for the light unit 1 (or 1' or 1").

In FIGS. 13 and 14, the light unit 1 is shown positioned atop an reflector marker light 66 of a tractor trailer truck 70. As shown, the light unit has a size that allows it to completely fit over reflector light 66 that commonly will have either a height or width that is less than three inches. The unit's magnets 34 are in firm contact with the metal surface 72 of the truck's body in the area surrounding the reflector 66. In the normal method of use, if a light becomes non-operational, the vehicle's operator would remove light unit 1 from its stored location. The unit's control switch 28 would then be moved to an "on" position. The operator would then place the light unit over reflector 66 or panel 30. This allows the magnets to securely fix the light unit to the vehicle.

In FIG. 14, two light units 1 are shown secured to the rear of truck 70 where they are placed two of the truck's existing reflector. Located beside the truck, in a free standing position, is another light unit 1. The latter use of the light unit as an emergency signalling device can obviously be used with other types of vehicles or as a marker in other types of emergency situations.

In FIG. 15, two light units 1 are mounted on the movable arm 74 of a railroad crossing control sign 76. In this use, when the arm is steel, the units 1 are secured using their magnets. If the attachment surface is not compatible with magnetic attachment, securement may be achieved by using the stand structure 36 to hook onto a portion of the surface, or by using either of the fastener or adhesive securements taught in the third embodiment of the invention.

In FIG. 16, a light unit 1 is shown secured to the seat 80 of a bicycle 82. In this instance, the magnets are in contact with a metal frame 84 that depends from the rear of the seat.

The embodiments disclosed herein have been discussed for the purpose of familiarizing the reader with the novel aspects of the invention. Although preferred embodiments of the invention have been shown and described, many changes, modifications and substitutions may be made by one having ordinary skill in the art without necessarily departing from the spirit and scope of the invention as described in the following claims.

I claim:

1. A battery-powered light unit comprising:

a housing having an interior battery compartment designed to contain a battery, wherein said housing includes flanges for attaching a panel thereto;

a bulb array releasably secured to a front portion of said housing, said bulb array being in the form of a plurality of light emitting diodes electrically connected together on a board means and wherein said board means includes an electrically conductive connector means adapted for a quick-release type of removable connection of said board to an electrical receiver means secured to said housing wherein said electrically conductive connector means being the only connection between said board and housing;

a switch means; and electrical connection means for connecting said electrical receiver means to said switch means and to a battery when said battery is located within said battery compartment.

* * * * *